(12) United States Patent
Lovett (10) Patent No.: US 7,090,147 B2
(45) Date of Patent: Aug. 15, 2006

(54) MOSQUITO MISTING SYSTEM

(76) Inventor: Rod Lovett, 2121 Brittmoore, #5200, Houston, TX (US) 77043

( * ) Notice: Subject to any disclaimer, the term of this patent is extended or adjusted under 35 U.S.C. 154(b) by 0 days.

(21) Appl. No.: 10/806,558

(22) Filed: Mar. 23, 2004

(65) Prior Publication Data

US 2005/0211796 A1    Sep. 29, 2005

(51) Int. Cl.
*B05B 9/04* (2006.01)
(52) U.S. Cl. .................. 239/332; 239/333; 239/69; 239/70; 239/74
(58) Field of Classification Search .............. 239/329, 239/331, 332, 333, 67–74, 143; 222/226
See application file for complete search history.

(56) References Cited

U.S. PATENT DOCUMENTS

| | | | |
|---|---|---|---|
| 2,445,717 A | 7/1948 | Richards | 47/38 |
| 2,668,082 A * | 2/1954 | Pasteur | 239/77 |
| 2,940,466 A | 6/1960 | Speights | 137/356 |
| 2,981,025 A | 4/1961 | Woodson | 43/124 |
| 3,151,746 A | 10/1964 | Reustle et al. | 43/124 |
| 3,209,485 A | 10/1965 | Griffin | 43/124 |
| 3,487,577 A | 1/1970 | Sexton | 43/113 |
| 3,513,586 A | 5/1970 | Meyer et al. | 43/124 |
| 3,676,949 A | 7/1972 | Ramsey | 43/124 |
| 3,782,026 A | 1/1974 | Bridges et al. | 43/124 |
| 3,793,762 A | 2/1974 | Stains | 43/124 |
| 3,889,881 A | 6/1975 | Cunningham et al. | 239/70 |
| 3,979,063 A | 9/1976 | Query | 239/70 |
| 4,028,841 A | 6/1977 | Lundwall | 43/124 |
| 4,185,650 A | 1/1980 | Neves et al. | 137/15 |
| 4,433,577 A * | 2/1984 | Khurgin et al. | 73/290 V |
| 4,650,792 A * | 3/1987 | Underwood | 514/89 |
| 4,742,641 A | 5/1988 | Cretti | 43/132.1 |
| 5,095,647 A | 3/1992 | Zobele et al. | 43/125 |
| 5,303,866 A * | 4/1994 | Hawks, Jr. | 239/142 |
| 5,333,785 A * | 8/1994 | Dodds et al. | 239/69 |
| 5,355,122 A | 10/1994 | Erickson | 340/602 |
| 5,611,172 A * | 3/1997 | Dugan et al. | 47/1.01 R |
| 5,853,122 A | 12/1998 | Caprio | 236/44 |
| 6,109,361 A | 8/2000 | Henderson | 169/54 |
| 6,194,160 B1 * | 2/2001 | Levin | 435/7.1 |
| 6,378,779 B1 | 4/2002 | Taylor | 239/63 |
| 6,452,499 B1 | 9/2002 | Runge et al. | 340/601 |
| 6,547,529 B1 * | 4/2003 | Gross | 417/36 |
| 6,558,078 B1 * | 5/2003 | Sowry et al. | 405/37 |
| 6,669,105 B1 * | 12/2003 | Bryan et al. | 239/61 |
| 6,823,239 B1 * | 11/2004 | Sieminski | 700/284 |
| 2001/0048037 A1 | 12/2001 | Bell et al. | 239/70 |

\* cited by examiner

*Primary Examiner*—Christopher Kim
(74) *Attorney, Agent, or Firm*—Shawn Hunter (57) ABSTRACT

A mosquito misting system is described having a liquid reservoir that is operably associated with a fluid pump and motor and fluid conduits to transmit a fluid insecticide to one or more dispersal nozzles. A controller is used to control the frequency and duration of dispersal. An agitator device is preferably associated with the fluid reservoir to adequately agitate the insecticide mixture within the reservoir during or just prior to dispersal of the fluid insecticide. The controller is interconnected with a level sensor assembly to provide a graphic indication of the level of fluid insecticide remaining in the reservoir. Additionally, the misting system is provided with a fluid pressure switch that detects a rupture in the fluid conduit and prevents further flow of fluid from the reservoir. In further aspects, the system is provided with remote control and, optionally, a remote monitoring feature that allows improved service and maintenance for the system.

7 Claims, 5 Drawing Sheets

MOSQUITO MISTING SYSTEM

BACKGROUND OF THE INVENTION

1. Field of the Invention

The invention relates generally to devices and systems for dispensing pesticides.

2. Description of the Related Art

Mosquitoes and other flying pests are a significant problem in most parts of the United States. These insects not only create a hazard for livestock and farm animals, but also for humans in residential areas. Mosquitoes are, for example, the primary carriers of West Nile virus. Personal sprays and citronella candles and torches are often used to combat the pests. However, such measures are often inadequate during certain times of the year when mosquito activity is high. Propane-based attractor devices are also known, but their effectiveness is debatable.

U.S. Pat. No. 3,889,881 issued to Cunningham et al. describes a system for dispensing pesticides, typically in animal husbandry facilities. Cunningham employs a fluid reservoir that contains a liquid insecticide mixed with water. The reservoir is operably interconnected with a pump and motor that draws the water/insecticide mixture from the reservoir and transmits it along conduits to several nozzles, where the mixture is dispersed into and around chicken coops and the like.

Cunningham's system has a number of drawbacks. The system relies upon a return conduit to create turbulence within the reservoir so that the insecticide will be adequately mixed with the water within which it is suspended. In practice, however, such an arrangement is insufficient to create adequate turbulence and mixing. Even with an increase in pump capacity and tubing size, the line losses along the conduits create such a drop in fluid velocity, that the fluid reentering the reservoir is slowed too greatly to be effective in mixing. As a result of the inadequate mixing, the insecticide mixture that is dispersed from the nozzles may be too diluted to be effective in controlling the insects. At the very least, the mixture will be inconsistent throughout use. Because of the inadequate mixing problem, the concentration of insecticide needed for the system to be effective is quite high. There is, therefore, some waste of this somewhat costly insecticide. Further, Cunningham's system is not suitable for use with fluid mixtures that contain microencapsulated insecticides, which are fluid insecticides that contain small capsules or pellets (microcapsules) of insecticide agent in suspension. Inadequate mixing leaves a significant amount of the microcapsules inside the fluid reservoir and does not effectively transmit them to the nozzles. Microencapsulated insecticides have additional benefits that cannot be realized by a system that is incapable of effectively dispensing them. Other fluid insecticide distribution systems have similar drawbacks.

The present invention is directed to overcoming the problems of the prior art.

SUMMARY OF THE INVENTION

The present invention provides improved devices and methods for distributing insecticide or other liquids. An exemplary misting system is described having a liquid reservoir that is operably associated with a fluid pump and motor and fluid conduits to transmit a fluid insecticide to one or more dispersal nozzles. A digital controller is used to control the frequency and duration of dispersal. An agitator device is preferably associated with the fluid reservoir to adequately agitate the insecticide mixture within the reservoir during or just prior to dispersal of the fluid insecticide. The frequency and duration of agitation is controlled by the controller. The controller is interconnected with a level sensor assembly to provide a graphic indication of the level of fluid insecticide remaining in the reservoir. Additionally, the misting system is provided with a fluid pressure switch that detects a rupture in the fluid conduit and prevents further flow of fluid from the reservoir.

The misting system and methods provide greatly improved protection against mosquitoes and other flying pests as well as significant potential cost savings as compared to conventional misting systems. The misting system is capable of effectively distributing insecticide fluids containing microencapsulated insecticide. Additionally, the misting system is usable in a wide variety of outdoor locations, including residential areas, such as the yards and areas surrounding homes. In further aspects, the system is provided with remote control and, optionally, a remote monitoring feature that allows improved service and maintenance for the system.

BRIEF DESCRIPTION OF THE DRAWINGS

For detailed understanding of the invention, reference is made to the following detailed description of the preferred embodiments, taken in conjunction with the accompanying drawings in which reference characters designate like or similar elements throughout the several figures of the drawings.

DETAILED DESCRIPTION OF THE PREFERRED EMBODIMENTS

Figure 1:
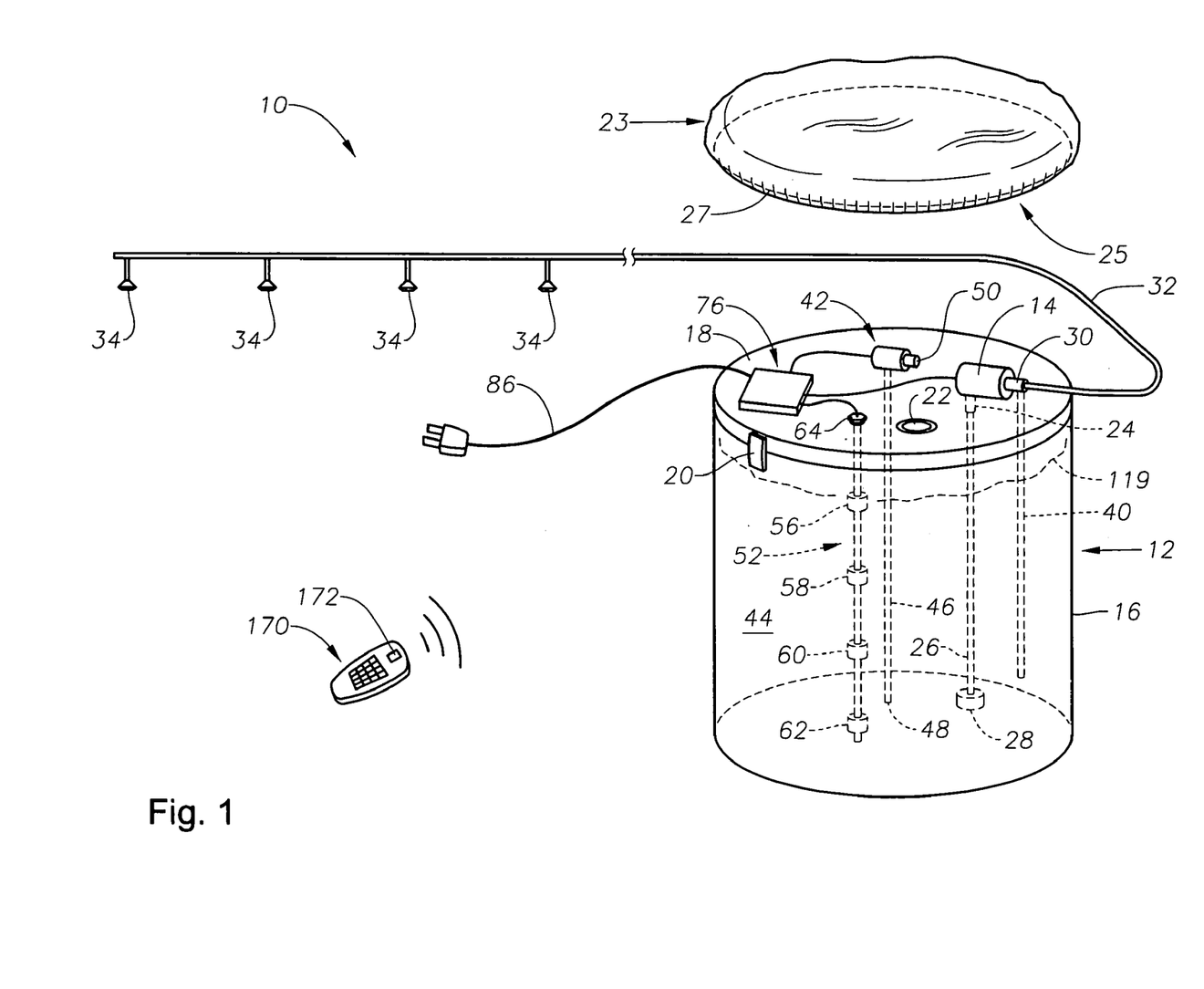
FIG. 1 is a schematic illustration of an exemplary mosquito misting system constructed in accordance with the present invention.

FIG. 1 depicts an exemplary mosquito misting system 10 that is constructed in accordance with the present invention. The misting system 10 is intended to provide anti-mosquito protection and protection against other flying insects and pests within a defined outside area, such as the yard of a residential home, areas surrounding commercial buildings, animal husbandry facilities, and so forth. The system 10 is also useful for spraying of other chemicals in addition to pest control insecticides.

The misting system 10 includes an insecticide reservoir 12 that is operably associated with a motorized fluid pump 14 and a controller 76. The reservoir 12 is preferably a refillable container of suitable size/volume to contain a desired amount of insecticide. Three currently preferred container sizes are 55, 125, and 225 gallon containers. Selection of the size of container depends upon the size of the area to be protected by the system, number of nozzles, and frequency of use. A suitable fluid pump and motor for use as motorized pump 14 is a Procon® canned motor pump 7000 series pump available from Procon® Products of 910 Ridgely Road, Murfreesboro, Tenn. 37129. The reservoir 12 includes a container body 16 and a removable lid 18 for the body 12. It is currently preferred that the container body 16 and lid 18 are fashioned from a durable plastic material. However, rust-resistant metals, fiberglass, or other suitably strong and durable materials might be used as well. Preferably, the lid 18 can be secured to the reservoir 12 by a locking clamp 20. A removable cap 22 is provided in the cover 18 for filling the reservoir 12 with a liquid insecticide and water. Optionally, a transparent protective cover 23 may be used to enclose the upper portion of the reservoir 12 to protect the controller 76 and other components from rain, snow, and other hazards. The cover is preferably fashioned from a transparent plastic and may have an opening 25 with an elastic band 27 for securing the cover 23 to the reservoir 12.

The pump 14 has a fluid inlet 24 that is connected to a fluid draw tube 26, which extends downwardly through the cover 18 and into the container body 16. A coarse particle filter 28 on the lower end of the fluid draw tube 26 screens out large particles that might tend to clog the nozzles of the system.

The fluid outlet 30 of the pump 14 is connected to a fluid conduit 32 that extends from the fluid reservoir 12 toward a plurality of fluid-dispensing nozzles 34. The nozzles 34 may be located to provide optimal dispersion of the fluid insecticide. Suggested locations for placement of the nozzles 34 in a residential setting are, for example, along the eaves of houses, the tops of fences, upon the ceilings of metal buildings, in trees, risers, flower beds, or in outbuildings, such as gazebos, kennels, sheds and the like. The system 10 may also be used in commercial developments or waste management sites.

Figure 3:
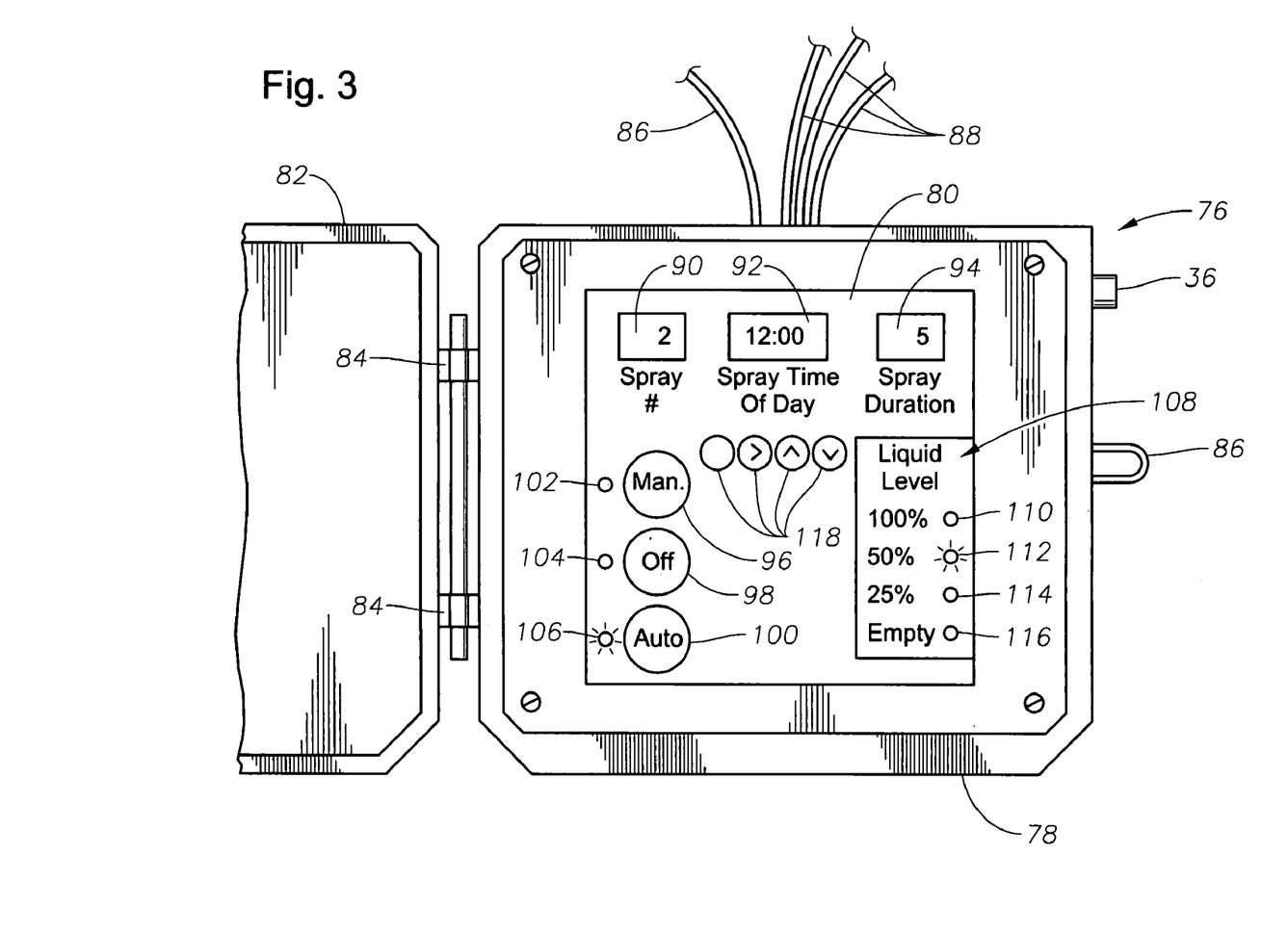
FIG. 3 illustrates an exemplary controller box with user interface panel.

A pressure switch 36 is operably associated with the controller 76 (see FIG. 3). The pressure switch 36 detects fluid pressure within the outgoing conduit 32 and provides a signal indicative of such pressure to the controller 76. One suitable pressure switch for this application is the PS-J style subminiature pressure switch available commercially from Gems Sensors of Plainville, Conn. The pressure switch 36 is operable to provide signals to the controller 76 indicating the fluid pressure within the conduit 32 during operation of the motor/pump 14. In the event that the switch 36 detects a pressure within the conduit 32 that the controller 76 considers a significant pressure drop, this would indicate a probable break in the conduit 32. The difference between the actual measured pressure and the expected pressure within the conduit 32 constituting a "significant pressure drop" may be preprogrammed into the controller 76. In general, however, a pressure drop of approximately 15 psi would be indicative of a break in the conduit 32. A break in the conduit 32 might occur if, for example, a squirrel were to chew through the conduit 32. This is an important safety feature provided by the system 10, as it prevents the unwanted spillage of insecticide. A fluid return line 40 extends downwardly from the fluid outlet 30 into the reservoir 12.

The system 10 includes an agitator 42 that provides for adequate mixing of the liquid insecticide mixture 44 within the container body 16. The agitator 42 preferably comprises a model 6015SE or 6025SE model linear piston vacuum pump available commercially from Rietschle Thomas Sheboygan, Inc. of Sheboygan, Wis. An air feed tube 46 extends downwardly into the reservoir 12 from the agitator 42 and provides an outlet 48 that, during use, is located proximate the lower end of the reservoir 12. When actuated, the agitator 42 draws outside air into an air inlet 50 and transmits it along the air feed tube 46 to the outlet 48. Actuation of the agitator 42 produces significant rolling agitation of the liquid insecticide mixture 44. The use of an actuator in accordance with the present invention provides a significant improvement over prior art techniques for mixing the fluid insecticide 44 and helps ensure that the mixture that is misted from the nozzle assembles 34 is effective.

Figure 2:
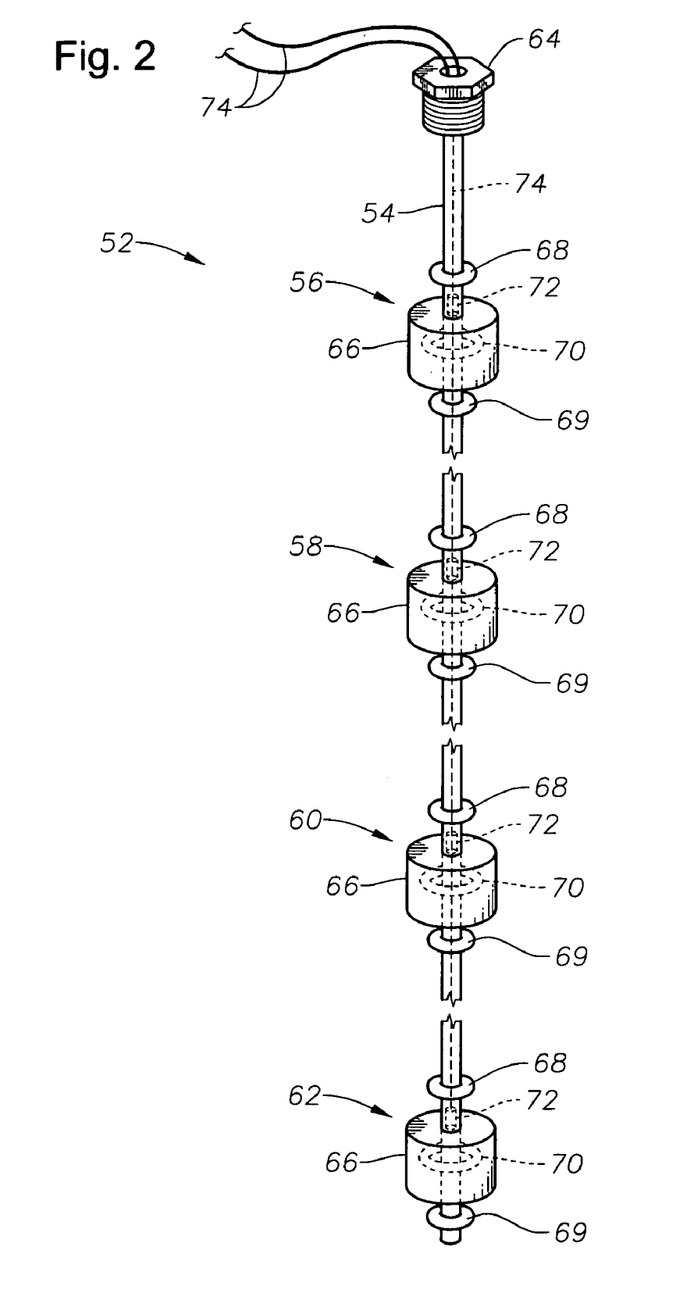
FIG. 2 depicts an exemplary level sensor assembly used with the system shown in FIG. 1.

It is preferred that a level sensor assembly 52 be provided within the reservoir 12 to detect the level of fluid remaining in the reservoir and to provide a signal to a controller that is indicative of such level. FIG. 2 depicts an exemplary, currently preferred level sensor assembly 52 that includes a longitudinal rod 54 and four float sensor assemblies 56, 58, 60, 62 secured along the length of the rod 54. The rod 54 is secured to the lid 18 of the fluid reservoir by a threaded screw nut 64 so that the rod 54 is disposed within the fluid 44 in the reservoir 12 (see FIG. 1). The float sensor assemblies 56, 58, 60, 62 each include a float member 66 that radially surrounds the rod 54 and is axially moveable thereupon. Stop rings 68, 69 are located above and below each float member 66, respectively. The stop rings 68, 69 are fixedly secured to the rod 54 and limit axial movement of the float members 66. The float members 66 are fashioned of a light, floatable material, such as a light plastic, and each contain an annular magnet 70 that is attracted to an interior magnet 72 disposed within the rod 54. The magnets 72 are located within the rod 54 so that, when a float member 66 is in a raised position (i.e., proximate or in contact with its upper stop ring 68), the annular magnet 70 is located adjacent or near the interior magnet 72. The increased attraction between the magnets 70 and 72 in this position will transmit a signal indicative of this position via wiring 74 to a controller, the details of which will be described shortly. However, when the float member 66 is in a lowered position, such that it is proximate or in contact with the lower stop ring 69, the magnets 70 and 72 are moved axially apart from one another, thereby reducing the attractive force between them and stopping transmission of the signal along wiring 74 that indicated their proximity.

The float sensor assemblies 56, 58, 60, 62 are positioned along the rod 54 to correspond to predetermined fluid levels within the reservoir 12. For example, the upper float sensor assembly 56 is positioned so that its float member 66 will float to the upper position and transmit a signal via wiring 74 when the reservoir 12 is full. When the reservoir 12 is less than full, the float member 66 of the upper float sensor assembly 56 will move to a lowered position, stopping the signal. The second float sensor assembly 58 is positioned so that it corresponds to a 50% full level in the reservoir 12. The third float sensor assembly 60 is positioned so that is corresponds to a 25% full level in the reservoir 12. The final float sensor assembly 62 is positioned to a level of empty in the reservoir 12. The following table provides suggested rod lengths and distances for float sensor assemblies for different container sizes.

|  | Container size | | |
| --- | --- | --- | --- |
|  | 55 Gallon | 125 Gallon | 225 Gallon |
| Length of rod 54 | 30 inches | 33½ inches | 40 inches |
| Distance of first float assembly from top of rod | 4 inches | 7 inches | 7 inches |
| Distance of second float assembly from top of rod | 14 inches | 18¼ inches | 18 inches |
| Distance of third float assembly from top of rod | 21 inches | 25½ inches | 27 inches |

-continued

| | Container size | | |
|---|---|---|---|
| | 55 Gallon | 125 Gallon | 225 Gallon |
| Distance of fourth float assembly from top of rod | 29 inches | 32½ inches | 36 inches |

Operation of the system 10 is controlled by a controller 76, which is shown in FIG. 1 to be mounted atop the reservoir lid 18. The controller 76 is better seen in FIG. 3 to include a weather-resistant protective receptacle, or housing box, 78 and a user interface panel 80. The interior of the housing box 78 contains the circuitry, programmable processor and storage media necessary for the operation of the system 10 in the manner that will be described.

The controller 76 preferably also includes a cover 82 that is affixed to the housing box 78 by hinges 84. The cover 82 is preferably transparent to allow viewing of the interface panel 80 even when the cover 82 is closed upon the box 78. A lockable hasp 86 is provided on the housing box 78 so that the controller 76 may be locked against unauthorized use by children or others. A power cord 86 and control cables 88 extend outwardly from the housing box 78. The power cord 86 is preferably a standard 120 volt outlet plug that may be used in typical residential outlets.

The user interface panel 80 in FIG. 3 illustrates a display and control interface that might be used for operation of the system 10. Along the upper end of the interface panel 80 are display windows 90, 92, 94 that display numeric information. The first display 90 displays the number of consecutive sprays of insecticide for a given time period (i.e., per day). During programming of the controller 76 by a user, the first display 90 is used for programming the spray cycles, agitation cycles, remote control cycles, and remote control counter. The second and third displays 92, 94 will depict the time of day for a given spray and the duration of spray, respectively. When programming, the first set of numbers displayed in 90 is a numeral of the set "1" through "12," designating consecutive sprays within a given time period (for example, per day). This number is used in conjunction with the displays in windows 92 and 94 to set the number of consecutive sprays. A second set of indicators in window 90 is "A1" "A9," designating the number of agitation cycles that will be performed by the agitator 42 in a given time period (i.e., a day). A third indicator in window 90 is provided for programming of the remote control 170 for the system 10. The display window 90 will display "rc" indicating that the remote 170 may be programmed. A display in window 94 is useful for setting the duration of a remote control commanded spray during a given time period. A fourth indicator in window 90 is a remote control counter. Both windows 90 and 92 will display "rcc," while the window 94 will display the number of times the remote control 170 was activated. This counter can be reset by the user.

Along the left side of the interface panel 80 are three control buttons 96, 98, 100 and representative indicator lights 102, 104, 106 for each of these control buttons. Using these buttons 96, 98, 100, the user may select to turn on the system 10 manually (button 96), turn it off (button 98), or engage the controller 76 to operate the system 10 automatically (button 100) according to its preprogrammed instructions. When one of the buttons 96, 98, 100 is pushed by the user, its accompanying indicator light 102, 104, or 106 is illuminated to display the status to the user. As a safety precaution, the controller 76 should be constructed so that the on/off button 96 must be held down for a minimum of two seconds before the system 10 will turn on. This will help ensure that the system 10 is not accidentally turned on or turned on by a small child. Additionally, the system 10 will ideally be constructed so that it will only operate in the manual "ON" mode (button 96) for a maximum of five minutes.

Along the right-hand side of the interface panel 80 is a liquid level display portion 108. The liquid level display portion 108 includes a series of labeled indicator lights 110, 112, 114, 116, each of which is operably interconnected with a float sensor assembly 56, 58, 60, 62 of the level sensor assembly 52. As the liquid level 119 (see FIG. 1) of the liquid 44 in the container body 16 drops due to operation of the system 10, the float sensor assemblies 56, 58, 60, 62 are sequentially moved to their lowered positions upon the rod 54, causing the lights 110, 112, 114, 116 in the liquid level display portion to indicate the present level of insecticide fluid remaining within the reservoir 12. It is noted that there may be more or fewer indicator lights and float sensor assemblies, and that the invention is not limited to four of each. Additionally, the interface panel 80 includes a number of programming buttons 118 that enable a user to select among a number of pre-programmed control parameters for the system. Selectable control parameters would include, for example, the duration of spraying during a spray cycle, the number of spray cycles per day, or the times for specific spray cycles to begin. Additionally, the user might select the duration of time for agitation by agitator 42 and whether agitation will commence prior to or commensurate with turning on of the pump and motor 14. It is preferred that information indicative of the various preprogrammed modes be displayed by display windows 90, 92, 94 during the selection process to assist the user.

Figure 4:
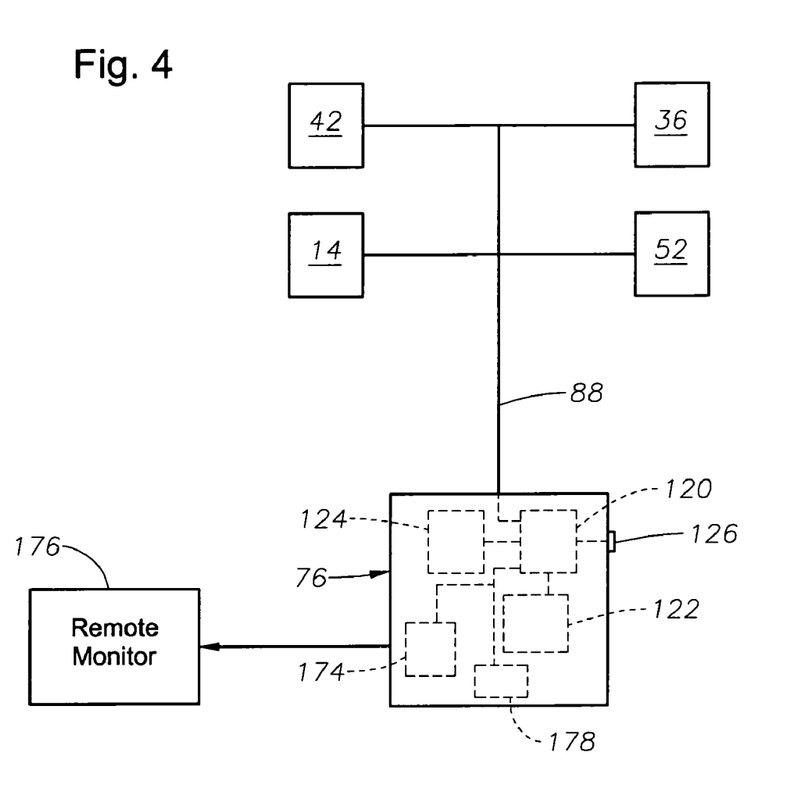
FIG. 4 is a block diagram of the controller and associated components that are operated by the controller.

FIG. 4 is a schematic block diagram illustrating the operable interconnection of the controller 76 with various devices within the system 10. The controller 76 includes a programmable digital processor 120, data storage media 122, and a timer 124. The data storage media 122 is used to store user input parameters, such as the times and duration of spray cycles. Programming of the processor 120 will not be described in detail herein, as such programming may be performed by one of skill in the art who is provided with the functional requirements of the physical components of the system 10. Preferably, the controller 76 also includes a weather sensor, such as a rain sensor, 126 that is interconnected with the processor 120. A suitable rain sensor for this application is one of the Hunter® model rain sensors available from Hunter Industries Incorporated of San Marcos, Calif. The rain sensor 126 detects moisture levels in the atmosphere and determines the presence of rain. The controller 76 is programmed to prevent operation of the motorized pump 14 in the event of rain, since rain will prevent misted insecticide from being effective. Thus, the cancellation of a spray cycle in the event of rain will conserve the fluid insecticide against waste. If desired, the sensor 126 may include other weather-sensing functions or be combined with a second sensor that detects wind and/or freezing temperatures and provide a signal indicative of that condition to the controller 76. Such weather sensors are known and sold commercially from variety of suppliers, including Hunter Industries Incorporated. Windy and freezing conditions are also conditions in which it is generally undesirable to spray the liquid insecticide, and the controller 76 may be programmed to abort a spray cycle in the event that any of these conditions are sensed.

Prior to operation of the system 10, the fluid reservoir 12 is filled with a fluid, typically water, that contains an insecticide concentrate. One suitable insecticide for use with the system 10 is Pyrethrin concentrate, which is sold commercially under the brand name Hydro-Py 300. However, a currently preferred insecticide is a microencapsulated Pyrethrin concentrate of 1.1% Pyrethrin. The microcapsules of insecticide are advantageous as they provide a residual protection against insects, typically up to seven days. When dispensed through the nozzle assemblies 34, the microcapsules remain on leaves and other surfaces within the misted areas for a period of time, providing extended mosquito protection. The insecticide concentrate is mixed with water in proportion and the resulting mixture is placed into the reservoir 12.

The controller 76 is operably interconnected via control cabling 88 with the pump and motor 14, pressure switch 36, agitator 42, and level sensor assembly 52. Exemplary automatic operation of the system 10 is depicted in the flow chart of FIG. 5. In step 150, the processor 120 queries the timer 124 to determine if it is time to begin a new spray cycle. If not, the processor 120 takes no action (step 152). If so, however, the processor 120 queries the level sensor assembly 52 (step 154) to determine whether the fluid reservoir 12 is empty. If so, the processor 120 cancels the spray cycle (step 156). If the reservoir 12 is not empty, the processor queries the weather sensor 126 to determine if there is an undesirable weather condition (rain, freezing or windy conditions)(step 158). If so, the spray cycle is cancelled (step 160). If no such conditions are detected, the processor 120 then starts the motorized pump 14 (step 162). The processor 120 waits for a preset amount of time after the start of the pump 14 and then queries the pressure switch 36 to determine if there is a significant pressure loss within the fluid conduit 32 (step 164), which would indicate a possible breach of the fluid conduit 32. If so, the spray cycle is cancelled (step 166) by the processor 120, which turns the motorized pump 14 off, preventing fluid transmission from the reservoir 12 outward through the conduit 32.

Figure 5:
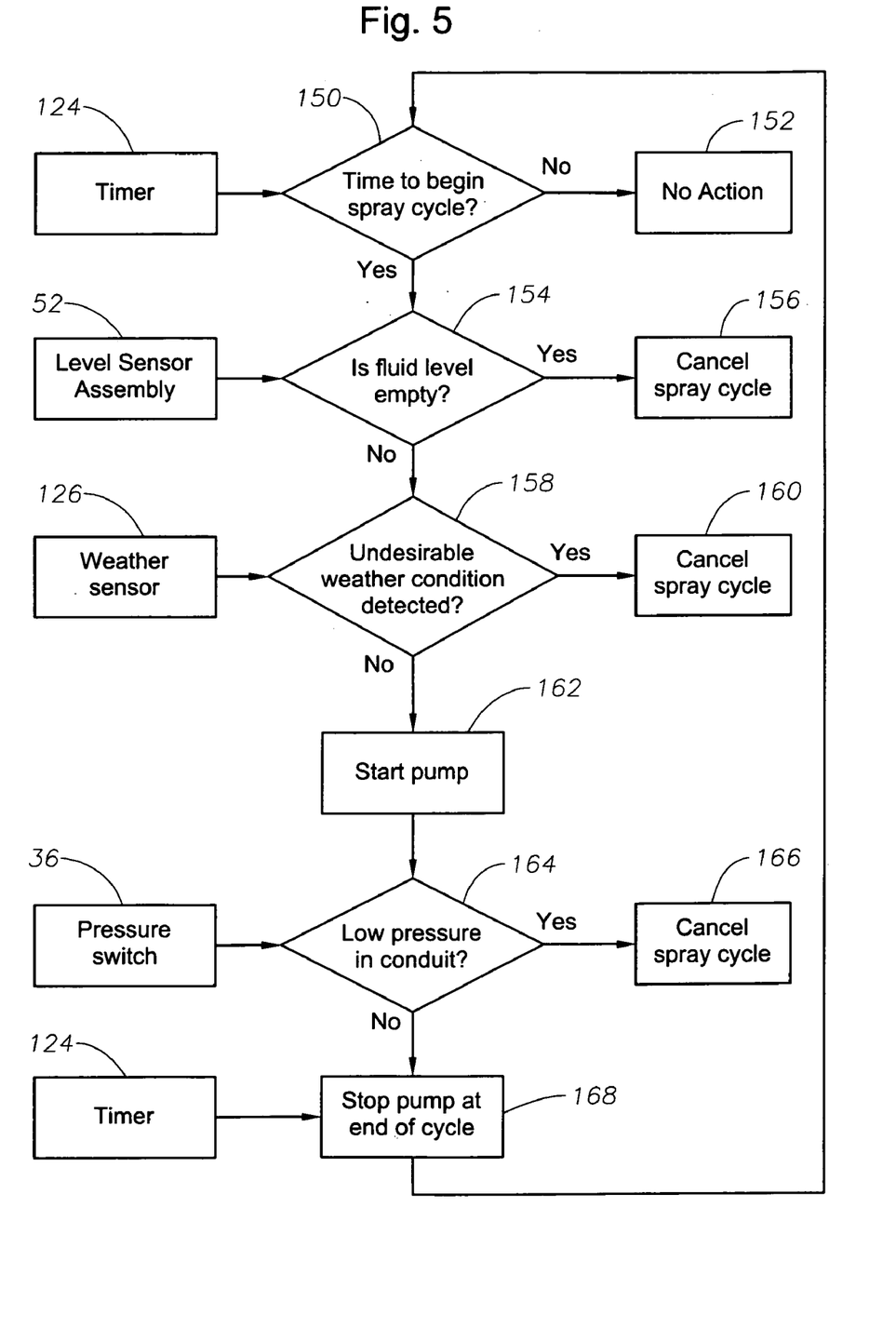
FIG. 5 is a flow chart illustrating steps in an exemplary automatic operation of the system.

It is noted that agitation by the agitator 42 would preferably occur in conjunction with (i.e., either just prior to or during) operation of the pump 14 to ensure that the mixture 44 is adequately mixed during the spraying process. It is further noted that agitation by the agitator 42 will occur regardless of whether a particular spray cycle is cancelled or proceeds. This ensures that the mixture 44 remains adequately mixed in the event that a user might manually begin spraying of the mixture. When the processor 120 determines from the timer 124 that the spray cycle should end, it commands the motorized pump 14 to turn off, stopping further spraying (step 168). The above process is iterative.

During spraying, the nozzle assemblies 34 provide fine atomization of the insecticide mixture. At the same time, the insecticide fluid is not screened so finely that microencapsulated insecticide particles are screened out of the mixture. One suitable nozzle assembly for this application is the model "HC" Eco-Valve from Hago Manufacturing Co., Inc. of 1120 Globe Avenue, Mountainside, N.J. 07092 which has been specially modified to meet the needs of the system 10. The HC Eco-Valve, for example, is designed to open at a pressure of 135 psi BAR and close at a pressure of 80 psi BAR, making it ideal for use in the system 10. However, this type of valve is sold with either a 100 mesh or 120 mesh cylindrical strainer. The inventors have recognized that a 50 mesh cylindrical screen is suitable for effective distribution of microencapsulated insecticides. Thus, the 100 or 120 mesh screen for this valve is preferably replaced with a 50 mesh screen.

In another aspect of the present invention, an optional wireless remote control 170 (FIG. 1) is provided for the controller 76 to permit a user to provide programming instructions to the controller 76 from a location other than the interface panel 80. The buttons for the remote control 170 may substantially mirror the panel buttons 96, 98, 100, and 118 of the interface panel 80 by including programming and mode selection buttons (manual, off, auto). Additionally, an on/off function button 172 is preferably included that permits the system 10 to be manually turned on and off by a user. The remote control 170 may communicate with the controller 76 using radio frequency, infrared signaling, or in other ways known in the art. The remote control 170 is typically used to override the automated, preprogrammed operation of the system 10. For example, a user may wish to initiate a spray cycle outside of the automated timing for such sprays. The user may do this by pressing an appropriate button on the remote control 170 to start the system 10 spraying immediately. A user might also desire to cancel a current spray cycle using the remote control 170 as an override.

Another aspect of the present invention provides for optional monitoring of the system 10 and similar other systems by a remote monitoring station. FIG. 4 illustrates the controller 76 as including a transmitter 174 that is operably connected with the processor 120 to transmit selected information from the processor 120 to a remote monitoring location, schematically shown at 176. The selected information preferably includes the liquid level 119 that is detected by the level sensor assembly 52 (i.e., between 100% and 50%, between 50% and 25%, below 25%, or empty). Additionally, it is preferred that the selected information include any detected actuation of the pressure switch 36 that would indicate a breach of the fluid conduit 32. The selected information is preferably transmitted to the remote monitoring location 176 wirelessly via satellite or radio tower, using any of a number of wireless techniques known in the art for transmission of data, such as cellular digital packaging data (CDPD). The selected information will also preferably include identification information relating to the system 10, such as a system identification number and/or information relating to the owner and address for the system, each of which is pre-stored within the processor 120. Additionally, the selected information might include a physical location for the system as might be obtained by a Global Positioning System (GPS) device 178 and provided to the processor 120.

The remote monitoring location 176 might be a local pest control dealer who supplies the system 10 to the user. The remote monitoring feature described above would permit the remote monitor 176 to monitor a large number of systems, such as system 10 for maintenance and support purposes. For example, upon receipt of selected information from a system that indicates that the liquid level 119 is less than 25%, a worker could be dispatched to refill the fluid reservoir 12 of that system. Additionally, if the remote monitor 176 receives selected information indicating that the pressure switch 36 has been actuated, this might indicate a breach of the conduit 32 in that system. A worker could be dispatched to the system's location to investigate and repair the problem.

Those of skill in the art will recognize that numerous modifications and changes may be made to the exemplary designs and embodiments described herein and that the invention is limited only by the claims that follow and any equivalents thereof.

What is claimed is:

1. A mosquito misting system comprising:
   a) a fluid reservoir for containing fluid insecticide;
   b) a misting nozzle for dispersal of fluid insecticide;
   c) a conduit for transmitting fluid insecticide from the reservoir to the nozzle;
   d) a pump for flowing fluid insecticide through the conduit;
   e) an agitator having a pump for drawing outside air from an outside air inlet and into the fluid reservoir for mixing of fluid insecticide within the reservoir;
   f) a programmable controller for selectively operating the pump and the agitator in accordance with pre-programmed control parameters;
   g) a transmitter for transmission of selected information relating to the system to a remote monitoring location, wherein the selected information includes an indicator of a level of fluid insecticide remaining in the fluid reservoir; and
   h) a level sensor assembly having a plurality of floating sensor assemblies located at selected levels within the reservoir, the level sensor further providing a signal to the controller indicative of the level of fluid insecticide within the reservoir.

2. The mosquito misting system of claim 1 further comprising a pressure switch operably associated with the fluid conduit to detect a pressure drop within the conduit and stop the pump in the event such a drop is detected.

3. The mosquito misting system of claim 1 further comprising a remote control for operation of the controller.

4. The mosquito misting system of claim 1 further comprising:
   a pressure switch operably associated with the fluid conduit to detect a pressure drop within the conduit; and
   wherein the selected information includes an indicator of low pressure within the fluid conduit.

5. The mosquito misting system of claim 1 further comprising:
   a global positioning system for obtaining a physical location of the system; and
   wherein the selected information includes information relating to a physical location of the system.

6. The mosquito misting system of claim 1 wherein:
   the controller includes stored programmed information identifying an owner of the system; and
   the selected information includes information identifying an owner of the system.

7. The mosquito misting system of claim 1 further comprising a moisture sensor for detection of rain proximate the system, the moisture sensor being operably associated with the controller so that detection of an unsuitable weather condition will result in cancellation of a spray cycle.

* * * * *